(12) United States Patent  (10) Patent No.: US 9,175,949 B2
Katsurada  (45) Date of Patent: Nov. 3, 2015

(54) CONTACT DISPLACEMENT METER

(71) Applicant: Keyence Corporation, Osaka (JP)

(72) Inventor: Masaaki Katsurada, Osaka (JP)

(73) Assignee: Keyence Corporation, Osaka (JP)

( * ) Notice: Subject to any disclaimer, the term of this patent is extended or adjusted under 35 U.S.C. 154(b) by 12 days.

(21) Appl. No.: 14/322,943

(22) Filed: Jul. 3, 2014

(65) Prior Publication Data

US 2015/0043010 A1 Feb. 12, 2015

(30) Foreign Application Priority Data

Aug. 9, 2013 (JP) .................. 2013-166289

(51) Int. Cl.
G01B 11/14 (2006.01)
G01D 5/347 (2006.01)

(52) U.S. Cl.
CPC ............ *G01B 11/14* (2013.01); *G01D 5/34746* (2013.01); *G01D 5/34776* (2013.01)

(58) Field of Classification Search
CPC . G01B 11/14; G01D 5/34746; G01D 5/34776
USPC ................................. 356/601–625
See application file for complete search history.

(56) References Cited

U.S. PATENT DOCUMENTS

| | | | | |
|---|---|---|---|---|
| 5,652,805 A * | 7/1997 | Ooenoki | ................... | B21D 5/02 382/141 |
| 5,841,520 A * | 11/1998 | Taniguchi | ........... | G03F 7/70241 250/201.1 |
| 6,798,390 B1 * | 9/2004 | Sudo | .................... | H04N 13/021 345/418 |
| 2007/0103665 A1 * | 5/2007 | Zimmerman | .......... | G02B 7/346 355/68 |
| 2009/0097002 A1 * | 4/2009 | Fukuda | ............... | G03F 7/70791 355/53 |
| 2010/0131235 A1 * | 5/2010 | Aoba | ................. | G01B 11/2518 702/153 |
| 2013/0201488 A1 * | 8/2013 | Ishihara | ................. | G01B 11/24 356/609 |

FOREIGN PATENT DOCUMENTS

JP 2009-236498 10/2009

* cited by examiner

*Primary Examiner* — Sang Nguyen
(74) *Attorney, Agent, or Firm* — Kilyk & Bowersox, P.L.L.C.

(57) ABSTRACT

A light-projecting unit irradiates a scale with non-parallel light. The non-parallel light having passed through a plurality of slits on the scale is received by a light-receiving unit, and a light reception signal indicating a light-receiving amount distribution is outputted. Based on the light reception signal, a plurality of positions where a light-receiving amount is at maximum or minimum in the light-receiving amount distribution on the light-receiving unit are detected as a plurality of peak positions. Based on correction information and the detected plurality of peak positions, a distance between a reference position and a position of at least one slit corresponding to at least one detected peak position is calculated. The correction information shows a relation of a distance between a plurality of peak positions and a distance between a plurality of slits on the scale which respectively correspond to the plurality of peak positions.

9 Claims, 12 Drawing Sheets

CONTACT DISPLACEMENT METER

CROSS-REFERENCE TO RELATED APPLICATIONS

The present application claims foreign priority based on Japanese Patent Application No. 2013-166289, filed Aug. 9, 2013, the contents of which is incorporated herein by reference.

BACKGROUND OF THE INVENTION

1. Field of the Invention

The present invention relates to a contact displacement meter using a contact.

2. Description of Related Art

A contact displacement meter has a contact which is linearly movable in one direction while being brought into contact with the surface of an object (e.g., see JP 2009-236498 A). A contact displacement meter of JP 2009-236498 A includes a light-emitting element, a line sensor, and a moving scale. The moving scale is connected to a contact. A predetermined pattern is arrayed in the moving scale along a direction in which the contact is movable.

Light emitted from the light-emitting element is turned into substantially parallel light by passing through a collimator lens, and the light then passes through the moving scale and is applied to a line sensor. Based on a light reception signal read by the line sensor, displacement of the contact is calculated.

In JP 2009-236498 A, it is possible to calculate displacement of the contact in units (sub-pixel units) smaller than a pixel of the line sensor by use of interference of the light having passed through the moving scale. However, an optical element for collimating light, such as the collimator lens, needs to be provided between the light-emitting element and the moving scale, and thus it is difficult to reduce the size of the contact displacement meter in a direction orthogonal to the moving direction of the contact.

SUMMARY OF THE INVENTION

An object of the present invention is to provide a contact displacement meter which can be reduced in size in a direction orthogonal to a moving direction of a contact.

(1) A contact displacement meter according to the present invention includes: a casing; a contact configured movably in one direction with respect to the casing; a scale which has a plurality of light transmitting slits arrayed in the one direction and is configured movably in the one direction along with the contact; a light-projecting unit which irradiates the scale with non-parallel light; a light-receiving unit which receives the non-parallel light having passed through the plurality of light transmitting slits on the scale, and outputs a light reception signal indicating a light-receiving amount distribution; a detecting unit which detects, as a plurality of peak positions, a plurality of positions where a light-receiving amount is at maximum or minimum in the light-receiving amount distribution on the light-receiving unit; and a calculating unit which calculates a distance between a reference position and a position of at least one light transmitting slit corresponding to at least one peak position detected by the detecting unit out of the plurality of light transmitting slits on the scale, based on the plurality of peak positions detected by the detecting unit and correction information showing a relation of a distance between a plurality of peak positions in the light-receiving amount distribution on the light-receiving unit and a distance between a plurality of light transmitting slits on the scale which respectively correspond to the plurality of peak positions, wherein the light-projecting unit, the scale, and the light-receiving unit are provided so as to be arrayed in a direction crossing the one direction.

In this contact displacement meter, a light-projecting unit irradiates a scale with non-parallel light. The non-parallel light having passed through a plurality of light transmitting slits on the scale is received by a light-receiving unit, and a light reception signal indicating a light-receiving amount distribution is outputted. Based on the light reception signal outputted from the light-receiving unit; a plurality of positions where a light-receiving amount is at maximum or minimum in the light-receiving amount distribution on the light-receiving unit are detected as a plurality of peak positions. Based on correction information and the detected plurality of peak positions, a distance between a reference position and a position of at least one light transmitting slit corresponding to at least one detected peak position out of the plurality of light transmitting slits on the scale is calculated.

The correction information shows a relation of a distance between a plurality of peak positions in the light-receiving amount distribution on the light-receiving unit and a distance between a plurality of light transmitting slits on the scale which respectively correspond to the plurality of peak positions. Therefore, even when the scale is irradiated with non-parallel light, a position of a light transmitting slit corresponding to a peak position can be calculated. Hence, there is no need to provide an optical element for collimating light, such as the collimator lens, between the light-projecting unit and the scale. It is thereby possible to reduce the size of the contact displacement meter in a direction orthogonal to the moving direction of the contact.

(2) Each of the plurality of light transmitting slits on the scale may be uniquely identifiably arrayed by use of an identifier which is based on a distance between a plurality of light transmitting slits including the light transmitting slit and having a predetermined positional relation, the contact displacement meter may further be provided with a first storage unit which stores a plurality of identifiers regarding the plurality of light transmitting slits on the scale, and the calculating unit may identify at least one light transmitting slit corresponding to at least one peak position detected by the detecting unit based on the plurality of peak positions detected by the detecting unit and the plurality of identifiers stored in the first storage unit.

In this case, each of the plurality of light transmitting slits can be identified based on a plurality of identifiers. Therefore, even when the light transmitting slit, located within a light irradiation range before movement of the scale, is located out of the light irradiation range after the movement of the scale, displacement of the contact can be calculated based on a position of one light transmitting slit being within the light irradiation range before the movement of the scale and a position of the other light transmitting slit being within the light irradiation range after the movement of the scale. Hence it is possible to calculate displacement of the contact having a longer size than the irradiation range of the light from the light-projecting unit to the scale.

(3) Each of the plurality of identifiers may include a ratio of distances between three or more peak positions having a predetermined positional relation.

According to this configuration, even when the parallelism between the light-receiving surface of the light-receiving unit and the scale is low, a plurality of light transmitting slits respectively corresponding to a plurality of peak positions can be identified. Hence, it is possible to alleviate the accuracy in assembly of the casing, the contact, the light-projecting unit, the light-receiving unit and the scale. Consequently, cost of the contact displacement meter is reduced.

(4) Each of the plurality of identifiers may include a distance between adjacent peak positions. In this case, a plurality of light transmitting slits respectively corresponding to a plurality of peak positions can be readily identified.

(5) The calculating unit may calculate a distance between at least two peak positions out of the plurality of peak positions detected by the detecting unit, identify at least two light transmitting slits corresponding to the at least two peak positions based on the identified at least one light transmitting slit, calculate as the correction information a value showing a relation of the calculated distance between at least two peak positions and a distance between the identified at least two light transmitting slits, and calculate a distance between a reference position and a position of at least one light transmitting slit corresponding to at least one peak position detected by the detecting unit based on the calculated correction information.

In this case, the correction information is calculated based on a distance between at least two peak positions out of the plurality of peak positions and a distance between at least two light transmitting slits corresponding to these peak positions. Therefore, even when the parallelism between the light-receiving surface of the light-receiving unit and the scale is low and when the parallelism between the light-receiving surface of the light-receiving unit and the scale varies with movement of the contact, a position of a light transmitting slit can be correctly calculated. Hence, it is possible to alleviate the accuracy in assembly of the casing, the contact, the light-projecting unit, the light-receiving unit, and the scale. Consequently, cost of the contact displacement meter can be reduced.

(6) The contact displacement meter may further include a second storage unit which previously stores correction information showing a relation of a distance between a plurality of peak positions in the light-receiving amount distribution on the light-receiving unit and a distance between a plurality of light transmitting slits on the scale which respectively correspond to the plurality of peak positions, wherein a distance between a reference position and a position of at least one light transmitting slit corresponding to at least one peak position detected by the detecting unit may be calculated based on the correction information stored in the second storage unit.

In this case, it is possible to readily calculate a position of a light transmitting slit at high speed based on the correction information previously stored in the second storage unit.

(7) The contact displacement meter may further include a second storage unit which previously stores correction information showing a relation of a distance between a plurality of peak positions in the light-receiving amount distribution on the light-receiving unit and a distance between a plurality of light transmitting slits on the scale which respectively correspond to the plurality of peak positions, wherein the calculating unit may correct the plurality of peak positions detected by the second detecting unit to a plurality of positions corresponding to a plurality of light transmitting slits based on the correction information stored in the second storage unit, and identify at least one light transmitting slit corresponding to at least one peak position detected by the detecting unit based on the corrected plurality of positions and the plurality of identifiers stored in the first storage unit.

In this case, it is possible to readily calculate a position of a light transmitting slit at high speed based on the correction information previously stored in the second storage unit. Further, by use of a distance between the corrected plurality of peak positions, at least one light transmitting slit corresponding to at least one peak position can be identified with high accuracy.

(8) The detecting unit may perform data processing on the light-receiving amount distribution of the light reception signal outputted from the light-receiving unit, to thereby detect a plurality of peak positions in smaller units than a pixel of the light-receiving unit. In this case, it is possible to calculate displacement of the contact with high accuracy.

(9) The reference position may be a position of an optical axis of the light-projecting unit on the scale. In this case, the reference position can be readily set.

(10) The casing may have a shape extending in one direction. In this case, the contact displacement meter has a long and narrow shape as a whole. Therefore, displacement of a measuring object can be measured through a narrow space. Further, the contact displacement meter can be readily kept and carried.

According to the present invention, it is possible to reduce the size of the contact displacement meter in a direction orthogonal to the moving direction of the contact.

DETAILED DESCRIPTION OF PREFERRED EMBODIMENTS

[1] First Embodiment (1) Configuration of Contact Displacement Meter

Figure 1:
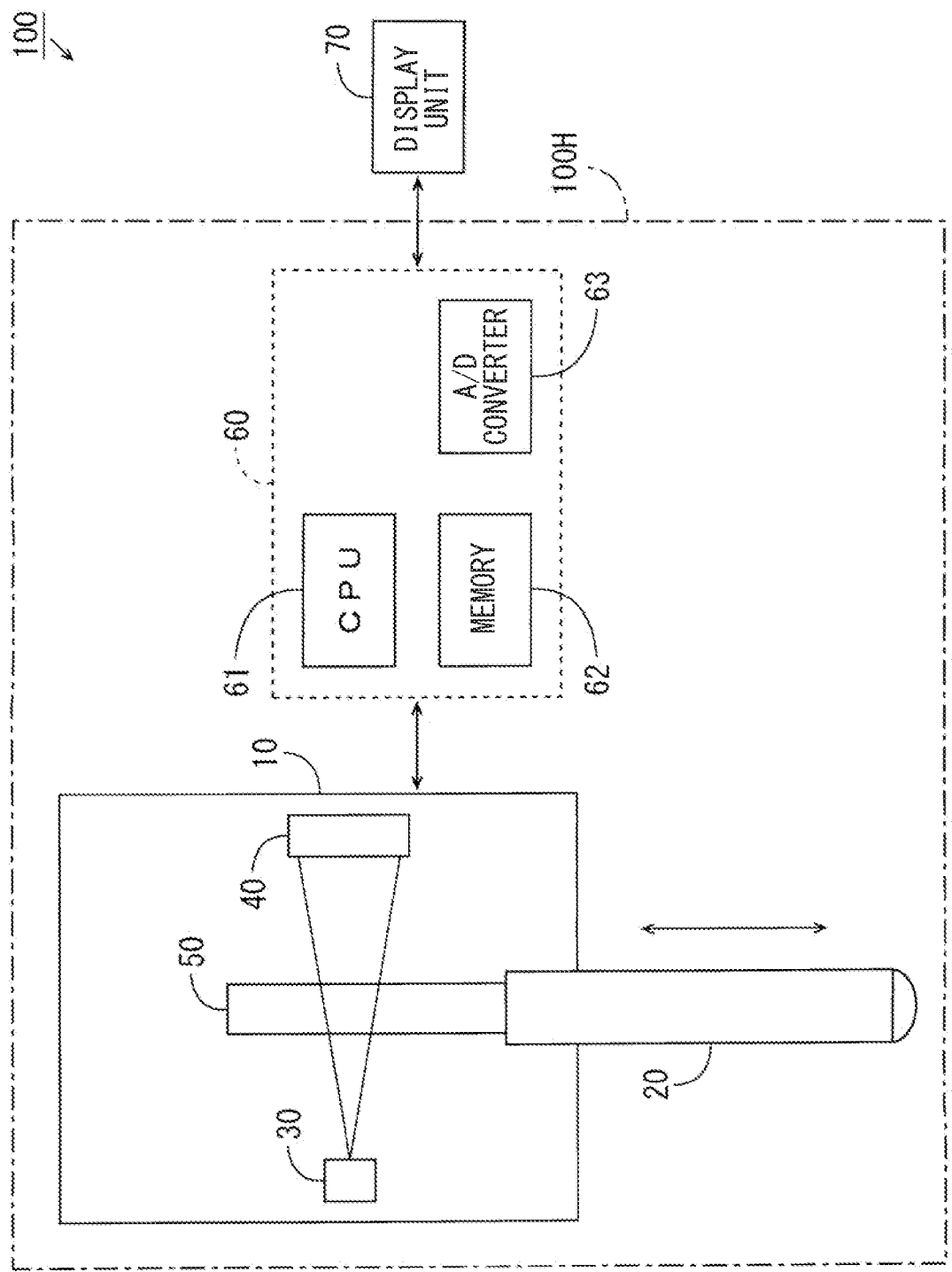
FIG. 1 is a block diagram showing a configuration of a contact displacement meter according to a first embodiment of the present invention.
Figure 2A:
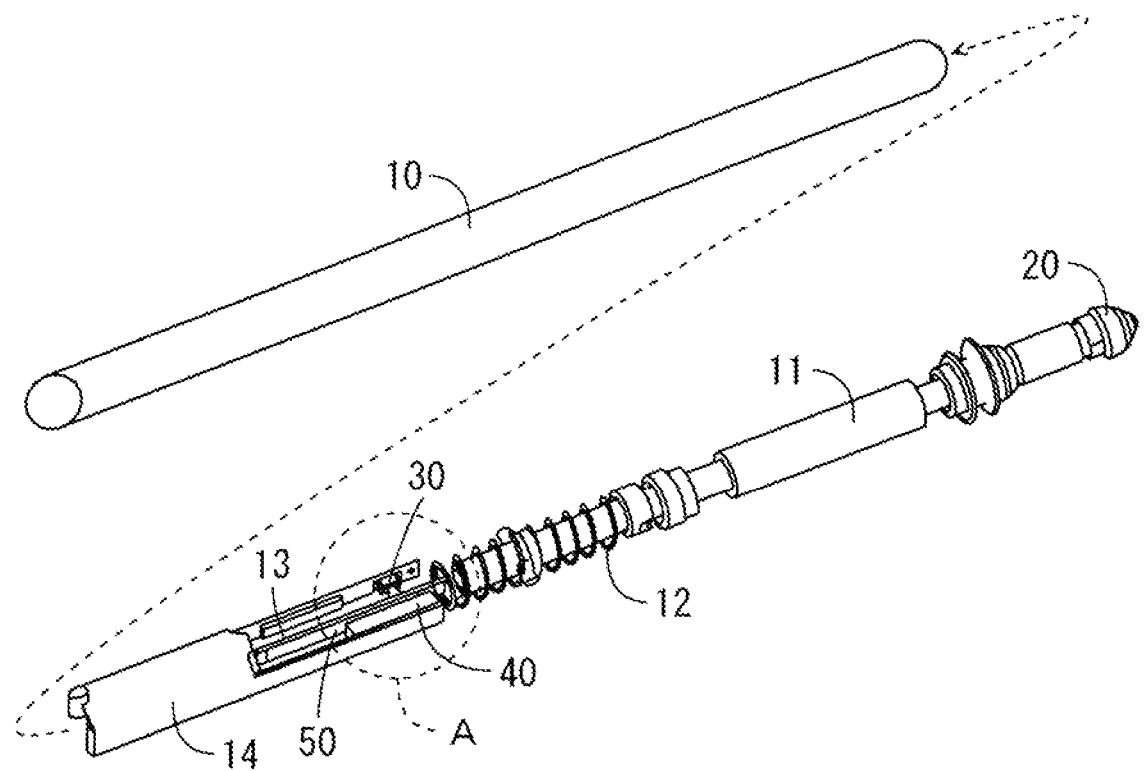
FIGS. 2A and 2B are views showing a casing of the contact displacement meter of FIG. 1.
Figure 2B:
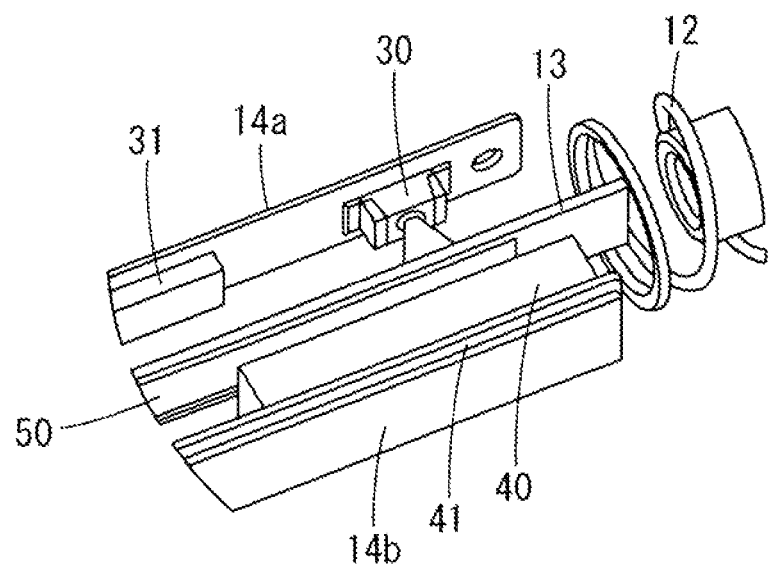

FIG. 1 is a block diagram showing a configuration of a contact displacement meter according to a first embodiment of the present invention. FIGS. 2A and 2B are views showing a casing of a contact displacement meter 100 of FIG. 1. FIG. 2A shows a configuration inside the casing, and FIG. 2B is an enlarged view of a part A of FIG. 2A. Hereinafter, with reference to FIG. 1 and FIGS. 2A and 2B, a description will be given of the contact displacement meter 100 according to the present embodiment.

As shown in FIG. 1, the contact displacement meter 100 includes a casing 10, a contact 20, a light-projecting unit 30, a light-receiving unit 40, a scale 50, a control unit 60, and a display unit 70. The light-projecting unit 30, the light-receiving unit 40 and the scale 50 are accommodated in the casing 10. Further, as shown in FIGS. 2A and 2B, a shaft 11, a spring 12, a scale holding portion 13, and an optical system holding portion 14 are accommodated in the casing 10.

In this example, the casing 10 has substantially the same external diameter as that of the contact 20. Hence, the contact displacement meter 100 has a long and narrow shape as a whole. Therefore, displacement of a measuring object can be measured through a narrow space. Further, the contact displacement meter 100 can be readily kept and carried.

The contact 20 is attached to one end of the shaft 11 movably in one direction with respect to the casing 10. The shaft 11 includes a ball bearing. Further, the scale holding portion 13 is attached to the other end of the shaft 11 via the spring 12. The scale 50 is made of a long plate member, and held by the scale holding portion 13. The scale 50 is, for example, formed of glass.

As shown in FIG. 2B, the optical system holding portion 14 has two supporting pieces 14a, 14b which extend in parallel toward the contact 20. The light-projecting unit 30 and an electric circuit 31 are attached to the inner surface of the one supporting piece 14a of the optical system holding portion 14. The electric circuit 31 supplies electric power to the light-projecting unit 30. On the other hand, the light-receiving unit 40 is attached to the inner surface of the other supporting piece 14b of the optical system holding portion 14 via a circuit substrate 41. The scale 50 is arranged between the two supporting pieces 14a, 14b of the optical system holding portion 14.

In this state, the shaft 11, the spring 12, the scale holding portion 13, and the optical system holding portion 14 are accommodated in the casing 10. Therefore, in the casing 10, the light-projecting unit 30 and the light-receiving unit 40 are opposed to each other with the scale 50 therebetween. The scale 50 is arranged so as to be substantially orthogonal to an optical axis of the light-projecting unit 30. The scale 50 has a plurality of slits. Each slit is given a specific number. Arrangement of the plurality of slits on the scale 50 will be described later.

The light-projecting unit 30 is, for example, an LED (light-emitting diode). The light-projecting unit 30 may be another light-emitting element such as an LD (Laser Diode). The light-projecting unit 30 is not provided with an optical element for collimating light, such as the collimator lens. Hence, the light emitted from the light-projecting unit 30 passes through part of the slits on the scale 50 while expanding at a predetermined angle, to be received by the light-receiving unit 40.

The light-receiving unit 40 is a line sensor having a plurality of light-receiving elements arrayed in one direction. The plurality of light-receiving elements constitute a plurality of pixels. In this example, each light-receiving element is a CMOS (Complementary Metal Oxide Semiconductor). Each light-receiving element may be another element such as a CCD (Charge-Coupled Device). The light-receiving unit 40 has the light-receiving surface made up of a plurality of pixels arrayed in one direction. The light-receiving surface of the light-receiving unit 40 is arranged so as to be substantially orthogonal to the optical axis of the light-projecting unit 30. An analog electric signal (hereinafter, referred to as light reception signal) indicating a light-receiving amount distribution on the light-receiving surface is outputted from the light-receiving unit 40 to the control unit 60 of FIG. 1 through the circuit substrate 41.

In this example, the control unit 60 of FIG. 1 is provided in a cable connecting between the casing 10 and the display unit 70. Hence, it is possible to reduce the size of the casing 10. As shown in FIG. 1, the control unit 60 includes a CPU (Central Processing Unit) 61, a memory 62, and an A/D (Analog/Digital) converter 63.

The light reception signal outputted from the light-receiving unit 40 is converted to a digital signal, while being subjected to sampling in a fixed sampling cycle, by the A/D converter 63. The digital signal outputted from the A/D converter 63 is sequentially stored in the memory 62 as light reception data indicating a light-receiving amount distribution. Further, a later-described displacement calculation program for the contact 20 is stored in the memory 62, and position calculation data to be used in displacement calculation processing for the contact 20 is stored therein.

The light reception data stored in the memory 62 is given to the CPU 61. The CPU 61 executes the displacement calculation program for the contact 20 based on the light reception data given from the memory 62 and the position calculation data stored in the memory 62. This leads to execution of the displacement calculation processing for calculating displacement of the contact 20. The display unit 70 is, for example, configured by a seven-segment indicator. The display unit 70 may be configured by a dot matrix indicator. The CPU 61 displays, on the display unit 70, displacement of the contact 20 calculated by the displacement calculation processing.

In this example, one measurement head 100H is configured by a set of the casing 10, the contact 20, the light-projecting unit 30, the light-receiving unit 40, the scale 50, and the control unit 60. A plurality of measurement heads 100H can be connected to one display unit 70. According to this configuration, a plurality of contacts 20 of the plurality of measurement heads 100H are respectively brought into contact with a plurality of parts of the measuring object, to thereby allow simultaneous measurement of thicknesses of the plurality of parts of the measuring object. Further, based on values of the measurement by the plurality of measurement heads 100H, it is possible to obtain the maximum value, the minimum value, and an average value of the thicknesses, or the flatness and the like of the measuring object as an evaluation value.

Data showing the measured value or the evaluation value is stored in the memory 62. Further, the CPU 61 can give the data to the outside through an interface (not shown). In this example, the CPU 61 can give a BCD (Binary Coded Decimal) output to an external programmable controller. Moreover, the CPU 61 can perform serial communication conforming to the RS-232C standard with an external personal computer or programmable controller.

(2) Slits on Scale

Figure 3:
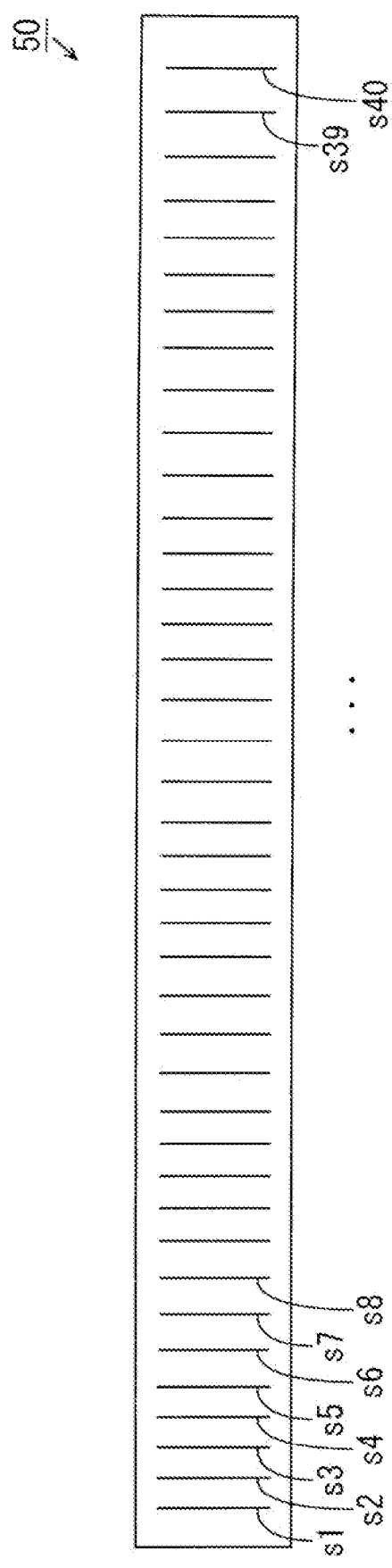
FIG. 3 is a schematic view showing arrangement of a plurality of slits on a scale.
Figure 4:
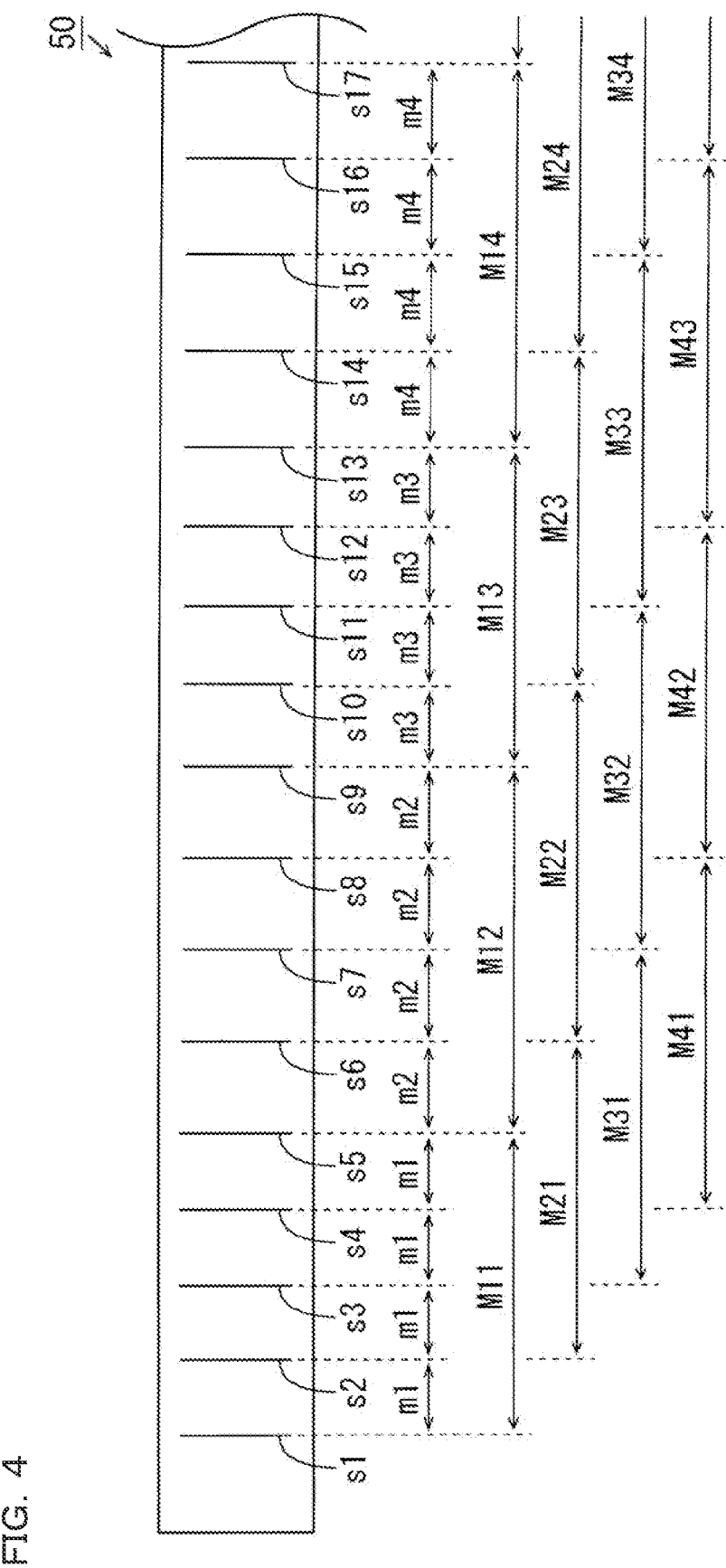
FIG. 4 shows an enlarged plan view of part of the scale of FIG. 3.
Figure 5:
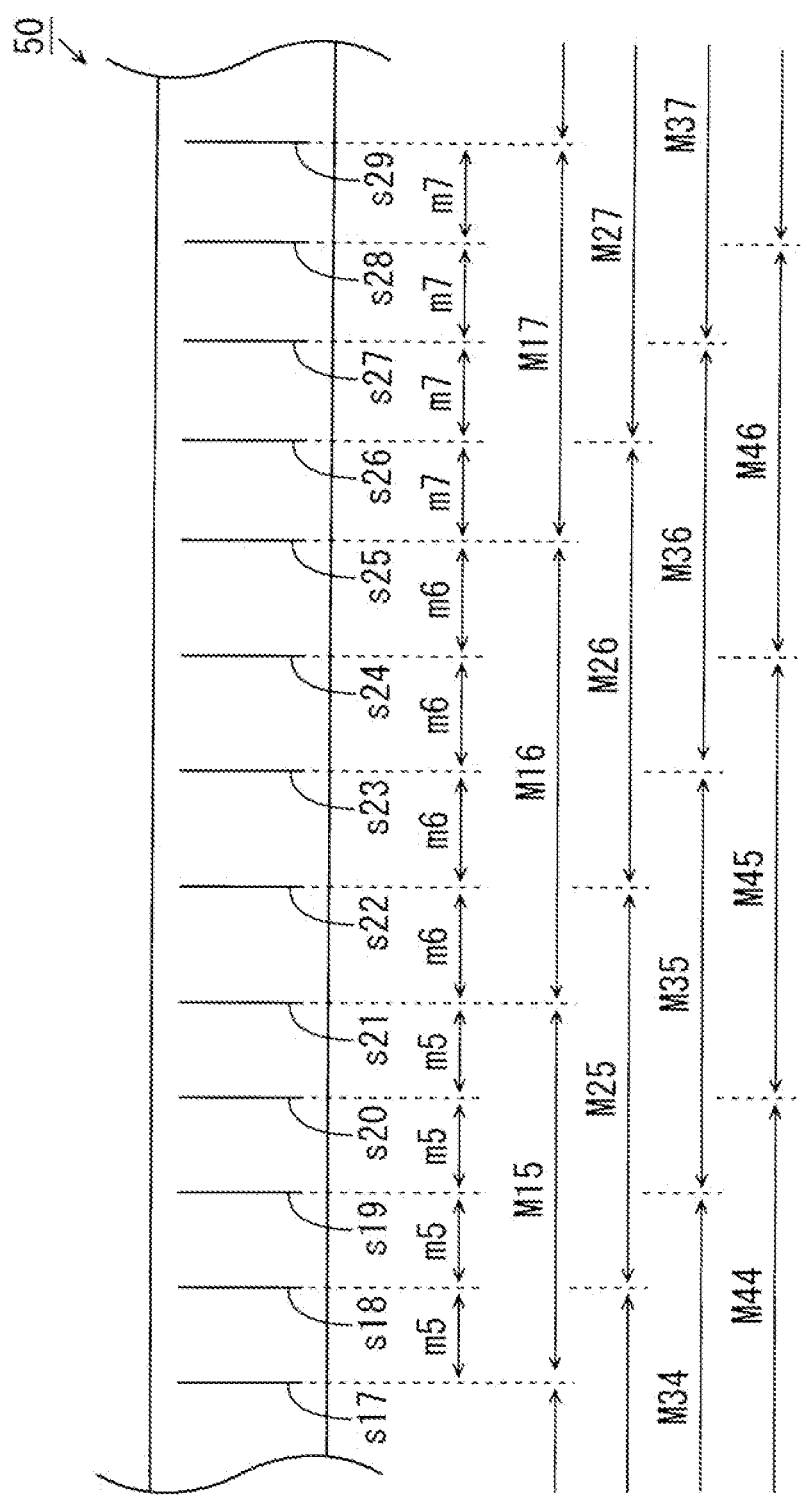
FIG. 5 shows an enlarged plan view of another part of the scale of FIG. 3.
Figure 6:
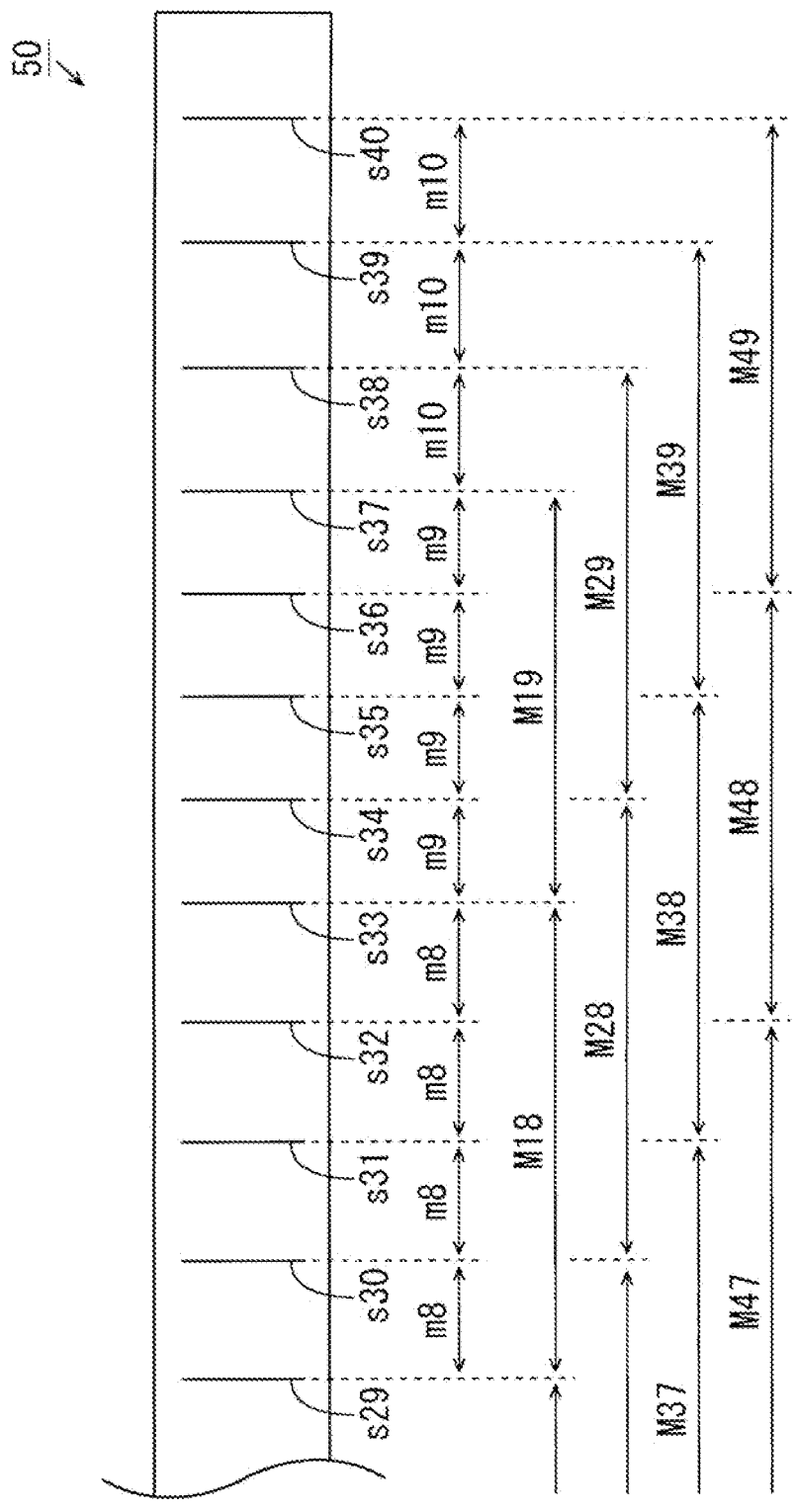
FIG. 6 shows an enlarged plan view of still another part of the scale of FIG. 3.

FIG. 3 is a schematic view showing arrangement of the plurality of slits on the scale 50. FIG. 4 shows an enlarged plan view of part of the scale 50 of FIG. 3. FIG. 5 shows an enlarged plan view of another part of the scale 50 of FIG. 3. FIG. 6 shows an enlarged plan view of still another part of the scale 50 of FIG. 3. In FIGS. 3 to 6, the slits are shown by lines.

As shown in FIGS. 3 to 6, in the present embodiment, 40 slits s1 to s40 are formed on the scale 50 so as to be arranged in this order. The slits s1 to s40 are respectively given specific numbers No. 1 to No. 40. The number of slits is not limited to those in the present embodiment.

The slits s1 to s40 are arranged such that a distance between adjacent slits changes every predetermined number of slits. In the present embodiment, the slits s1 to s40 are arranged such that the distance between adjacent slits changes every five slits. That is, when k=1, 2, . . . , 10, a distance between each of slits s(4×k−3), s(4×k−2), s(4×k−1), s(4×k), and s(4×k+1) is mk.

For example, a distance between each of the slits s1, s2, s3, s4, and s5 is m1, and a distance between each of the slits s5, s6, s7, s8, and s9 is m2. Each of distances m1 to m10 between adjacent slits is longer than a wavelength of the light emitted by the light-projecting unit 30 of FIG. 1. In the present embodiment, each of the distances m1 to m10 is different. Note that, although a 41st slit s41 is not provided in this example, it may be provided.

A distance between the slits at both ends out of the sequentially arranged five slits is defined as follows. When k=1, 2, . . . , 9, a distance between slits s(4×k−3) and s(4×k+1) is M1k, and a distance between slits s(4×k−2) and s(4×k+2) is M2k. Further, a distance between slits s(4×k−1) and s(4×k+3) is M3k, and a distance between slits s(4×k) and s(4×k+4) is M4k.

For example, a distance between the slits s1 and s5 is M11, and a distance between the slits s5 and s9 is M12. Further, a distance between the slits s2 and s6 is M21, and a distance between the slits s6 and s10 is M22. In the present embodiment, each of distances M11 to M19, M21 to M29, M31 to M39, and M41 to M49 is different.

Next, a ratio of each two adjacent distances out of the above distances is defined as follows. When k=1, 2, . . . , 8, M1(k+1)/M1k, M2(k+1)/M2k, M3(k+1)/M3k, and M4(k+1)/M4k are respectively N1k, N2k, N3k, and N4k.

For example, M12/M11 is N11, and M13/M12 is N12. Further, M22/M21 is N21, and M23/M22 is N22. Each of ratios N11 to N18, N21 to N28, N31 to N38, and N41 to N48 is previously calculated and stored as the position calculation data in the memory 62 of FIG. 1.

Each of the ratios N11 to N18, N21 to N28, N31 to N38, and N41 to N48 is different. Therefore, specifying the above ratio allows identification of slits where the light from the light-projecting unit 30 passed in the displacement calculation processing. Note that, when each of the ratios N11 to N18, N21 to N28, N31 to N38, and N41 to N48 is different, the distances m1 to m10 between the slits s1 to s40 may not all be different.

(3) Detection of Position of Light-Receiving Amount Peak

The light emitted from the light-projecting unit 30 passes through part of the plurality of slits s1 to s40 included on the scale 50, and is then incident on the light-receiving unit 40. Therefore, in the light-receiving amount distribution represented by the light reception data stored in the memory 62, there appear a plurality of peaks (hereinafter, referred to as light-receiving amount peaks) respectively corresponding to the plurality of slits where the light from the light-projecting unit 30 have passed.

Figure 7A:
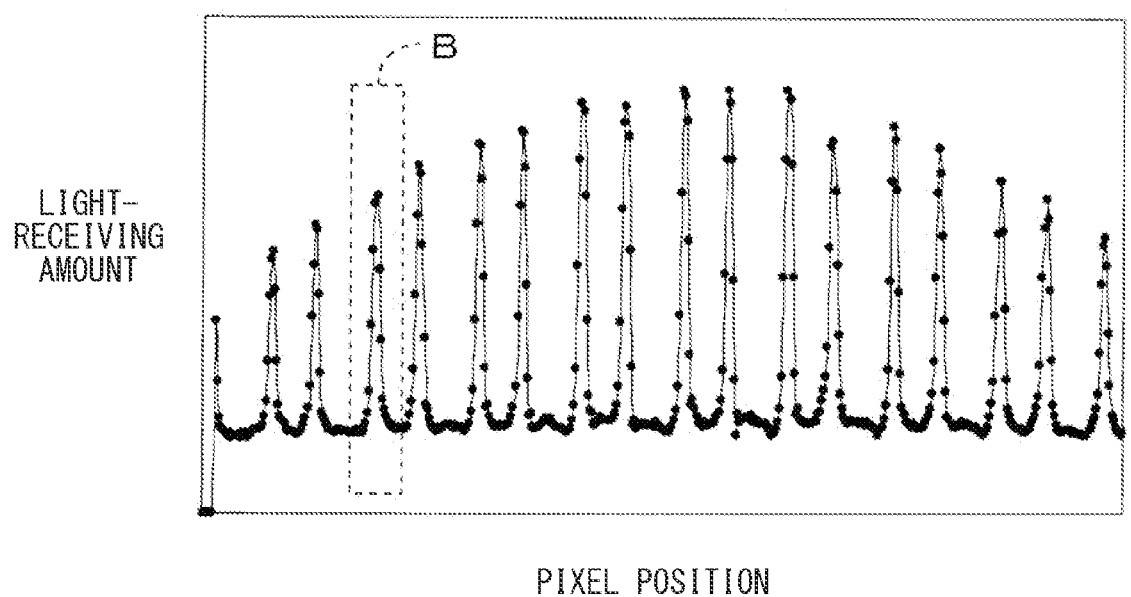
FIG. 7A is a diagram showing a light-receiving amount distribution represented by light reception data.
Figure 7B:
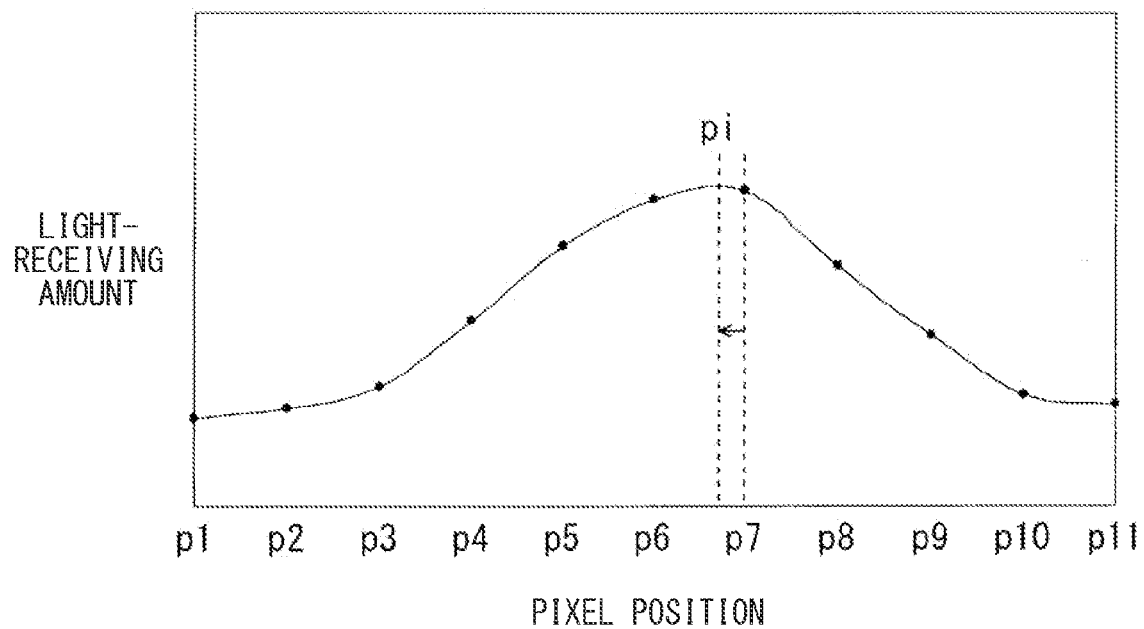
FIG. 7B shows an enlarged diagram thereof.

FIG. 7A is a diagram showing a light-receiving amount distribution represented by the light reception data, and FIG. 7B shows an enlarged diagram of a part B of FIG. 7A. In FIGS. 7A and 7B, a horizontal axis indicates a position of a pixel (hereinafter, referred to as pixel position) in the light-receiving unit 40, and a vertical axis indicates a light-receiving amount.

By performing data processing on the light-receiving amount distribution of FIG. 7A, positions of a plurality of light-receiving amount peaks are detected in units (sub-pixel units) smaller than the pixel of the light-receiving unit 40. Hereinafter, the position of the light-receiving amount peak is referred to as a peak position. FIG. 7B shows a distribution of light-receiving amounts at pixel positions p1 to p11.

Here, when the data processing is not performed on the light-receiving amount distribution, the pixel position p7 is a peak position. A real peak position is between the pixel positions p6 and p7. Then, the data processing is performed on the light-receiving amount distribution, to thereby calculate a real peak position pi in sub-pixel units.

In order to detect the real peak position pi in sub-pixel units, it is possible to use data processing by means of a variety of known methods. For example, center-of-gravity processing may be performed on the light-receiving amount distribution, to thereby detect the real peak position pi. Alternatively, a variety of curves such as parabolic curves may be fitted to the light-receiving amount distribution, to thereby detect the real peak position pi.

Figure 8:
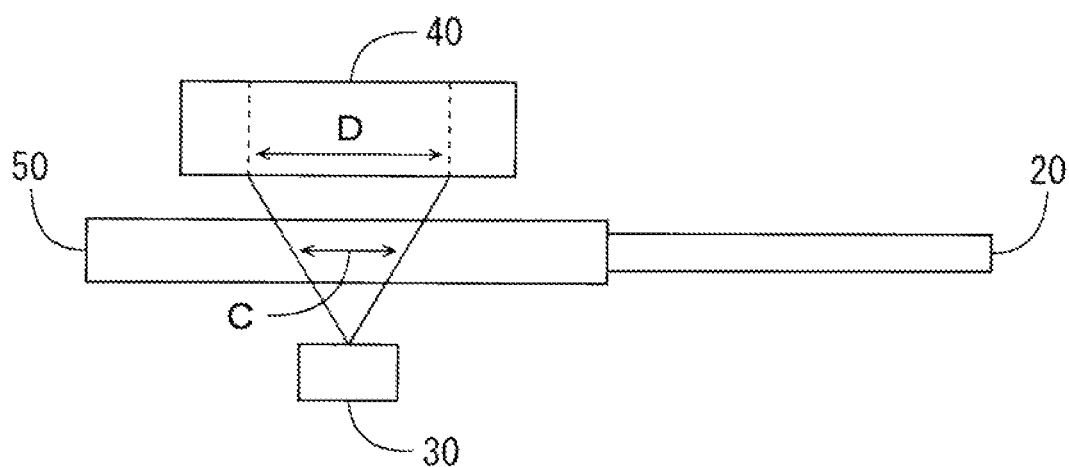
FIG. 8 is a schematic view showing a relation of a light-projecting unit, the scale, and a light-receiving unit.

FIG. 8 is a schematic view showing the relation of the light-projecting unit 30, the scale 50, and the light-receiving unit 40. As shown in FIG. 8, the light emitted from the light-projecting unit 30 passes through a plurality of slits within a range C of the scale 50 while expanding at a predetermined angle, and is incident within a range D of the light-receiving surface of the light-receiving unit 40.

As described above, a plurality of peak positions in a light-receiving amount distribution within the range D of the light-receiving surface are detected in sub-pixel units by the data processing using the light reception data. The detected plurality of peak positions respectively correspond to the plurality of slits within the range C of the scale 50.

Figure 9:
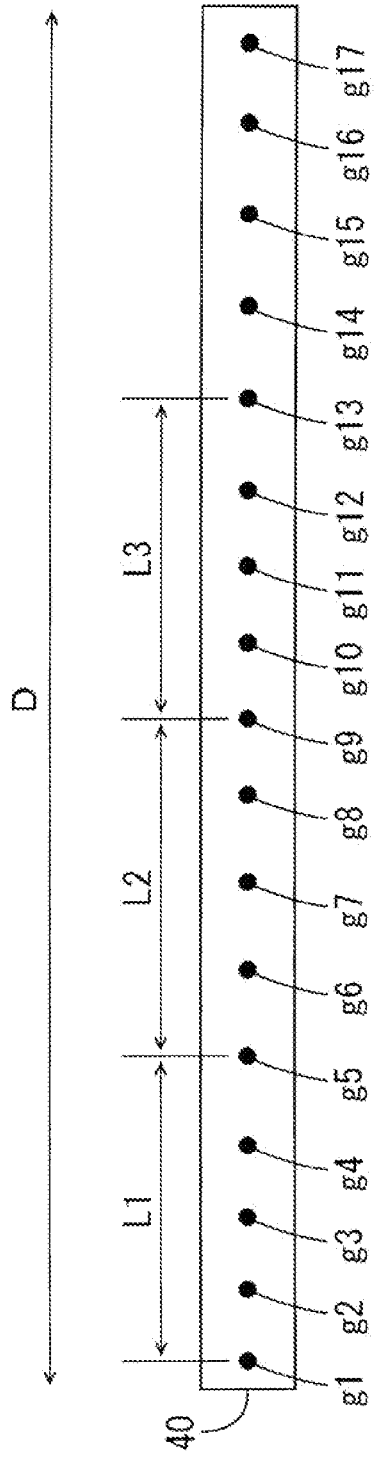
FIG. 9 is a schematic view showing a plurality of peak positions in a light-receiving amount distribution within a range D of the light-receiving surface.

FIG. 9 is a schematic view showing the plurality of peak positions in the light-receiving amount distribution within the range D of the light-receiving surface. A horizontal axis of FIG. 9 indicates the pixel position in the light-receiving unit 40. In FIG. 9, a plurality of peak positions g1 to g17 detected by the data processing on the light reception data are indicated by black circles.

(4) Specification of Slits

It is unclear which part of the entire scale 50 is the part of the scale 50 where the light has passed (the range indicated by an arrow C in FIG. 8). Therefore, the slits where the light has passed are unclear, and which slits the respective peak positions g1 to g17 shown in FIG. 9 correspond to is unclear. In the present embodiment, slits are specified by the following procedure.

As shown in FIG. 9, a distance between peak positions at both ends out of a predetermined number of sequentially arranged peak positions is calculated. In the present embodiment, a distance L1 between the peak positions g1 and g5 at both ends out of sequentially arranged five peak positions is calculated. Further, a distance L2 between the peak positions g5 and g9 at both ends out of sequentially arranged five peak positions is calculated. Moreover, a distance L3 between the peak positions g9 and g14 at both ends out of sequentially arranged five peak positions is calculated.

Next, a ratio R1 of the distance L2 with respect to the distance L1 is calculated. Further, a ratio R2 of the distance L3 with respect to the distance L2 is calculated. The calculated ratios R1 and R2 are checked with the plurality of ratios N11 to N18, N21 to N28, N31 to N38, and N41 to N48, which are previously stored in the memory 62 of FIG. 1.

Here, two ratios which are closest to the ratios R1 and R2 are extracted out of the plurality of ratios N11 to N18, N21 to N28, N31 to N38, and N41 to N48. Hence, it is possible to specify numbers of the plurality of slits where the light has passed, and respectively associate the plurality of peak positions g1 to g17 with the plurality of slits where the light has passed.

As one example, if the ratios N25 and N26 are respectively closest to the ratios R1 and R2, the distances M25, M26, and M27 between the slits (FIG. 5) respectively correspond to the distances L1, L2, and L3 between the peak positions. Therefore, the peak positions g1 to g17 respectively correspond to the slits s18 to s34. Further, the numbers of the plurality of slits where the light has passed are respectively specified as No. 18 to No. 34.

(5) Absolute Position of Contact

With the above method, the numbers of the plurality of slits respectively corresponding to the plurality of peak positions in the light-receiving amount distribution are specified. At this time, the distances between the plurality of slits on the scale 50 are known, but an absolute position of each slit is unknown. An absolute position of an arbitrary slit on the scale 50 is calculated by the following procedure.

Figure 10:
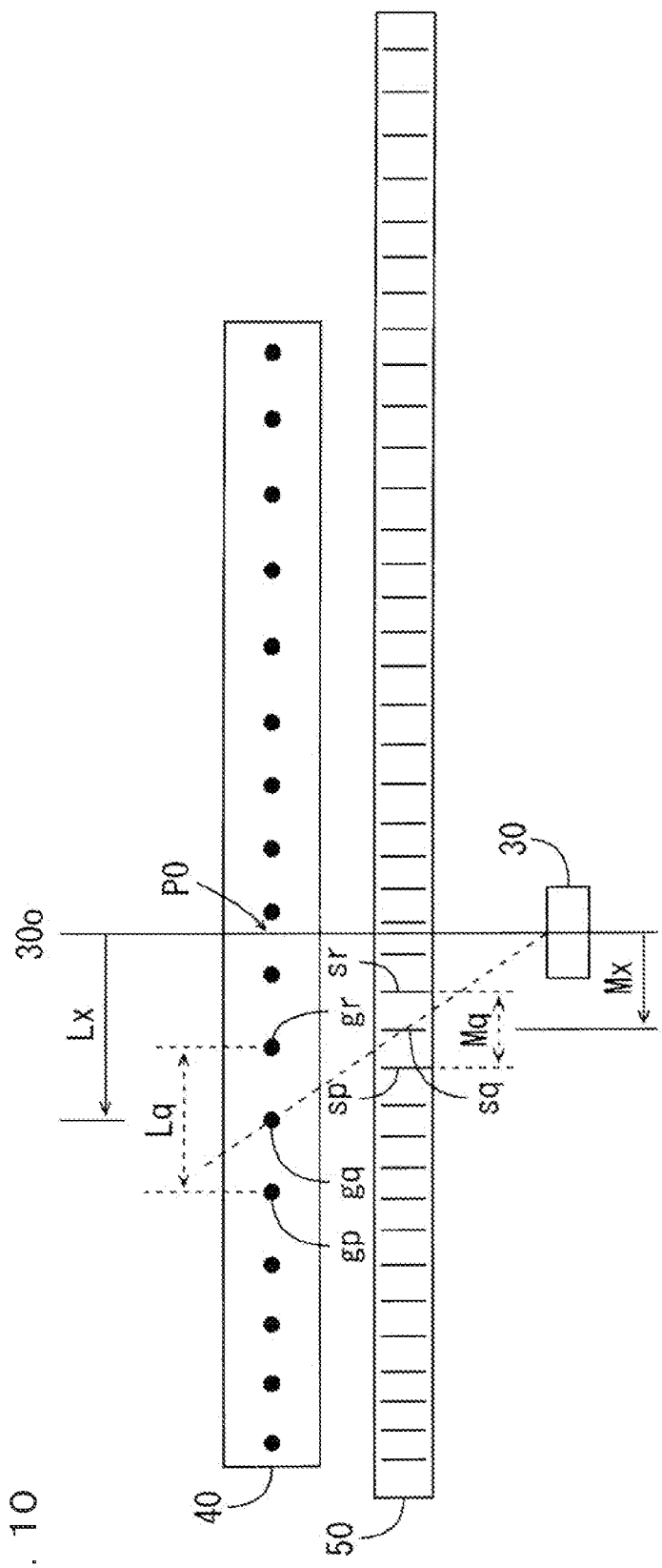
FIG. 10 is a view for describing a calculation procedure for an absolute position of a slit.

FIG. 10 is a view for describing a calculation procedure for an absolute position of a slit. In the procedure of FIG. 10, an absolute position of an arbitrary slit sq where the light from the light-projecting unit 30 has passed is calculated. Here, the absolute position of the slit sq is a distance Mx from an optical axis 30o of the light-projecting unit 30 to the slit sq.

Two slits sp and sr, which are located with the slit sq therebetween, are previously selected. In the example of FIG. 10, the slits sp and sr are slits located at both sides of the slit sq, and a distance between the slits sp and sr is Mq. With the above method, numbers of the slits sp, sq, and sr are specified, and hence the distance Mq is also specified. By the light from the light-projecting unit 30 passing through the slits sp to sr, peaks in the light-receiving amount distribution appear at peak positions gp, gq, and gr respectively corresponding to the slits sp to sr.

A position (hereinafter, referred to as optical axis position) P0 of the optical axis 30o on the light-receiving surface of the light-receiving unit 40 is known. Based on the light reception data, a distance Lx from the optical axis position P0 to the peak position gq is calculated, and a distance Lq between the peak positions gp and gr is calculated. Subsequently, a ratio (Lq/Mq) of the distance Lq with respect to the distance Mq is calculated as a multiplication rate R. Thereafter, the distance Lx is divided by the multiplication rate R, to thereby calculate the distance Mx.

A distance between each slit to the tip of the contact 20 is known. Hence, based on the absolute position of the slit sq, the absolute position of the contact 20 can be calculated. According to the above calculation procedure for an absolute position of a slit, it is possible to correctly calculate the absolute position of the contact 20 even when the scale 50 tilts with respect to the light-receiving surface of the light-receiving unit 40 with movement of the contact 20.

When the contact 20 of FIG. 1 comes into contact with the surface of the measuring object, the contact 20 is displaced. The absolute position of the contact 20 before the contact 20 comes into contact with the surface of the measuring object is subtracted from the absolute position of the contact 20 at the time when the contact 20 makes contact with the surface of the measuring object, to thereby calculate displacement of the contact 20.

As described above, displacement of the contact 20 is calculated based on a change in absolute position of each of the slits s1 to s40. It is thus possible to calculate displacement of the contact 20 based on a position of an arbitrary slit before the contact 20 comes into contact with the surface of the measuring object, a position of another arbitrary slit after the contact 20 comes into contact with the surface of the measuring object, and a distance between the slits.

Therefore, even when some slits are displaced out of the irradiation range of the light from the light-projecting unit 30 due to the contact 20 making contact with the surface of the measuring object, displacement of the contact 20 can be calculated by calculating an absolute position of another slit. Hence, it is possible to calculate displacement of the contact 20 having a longer size than the irradiation range of the light from the light-projecting unit 30 to the scale.

(6) Displacement Calculation Processing

Figure 11:
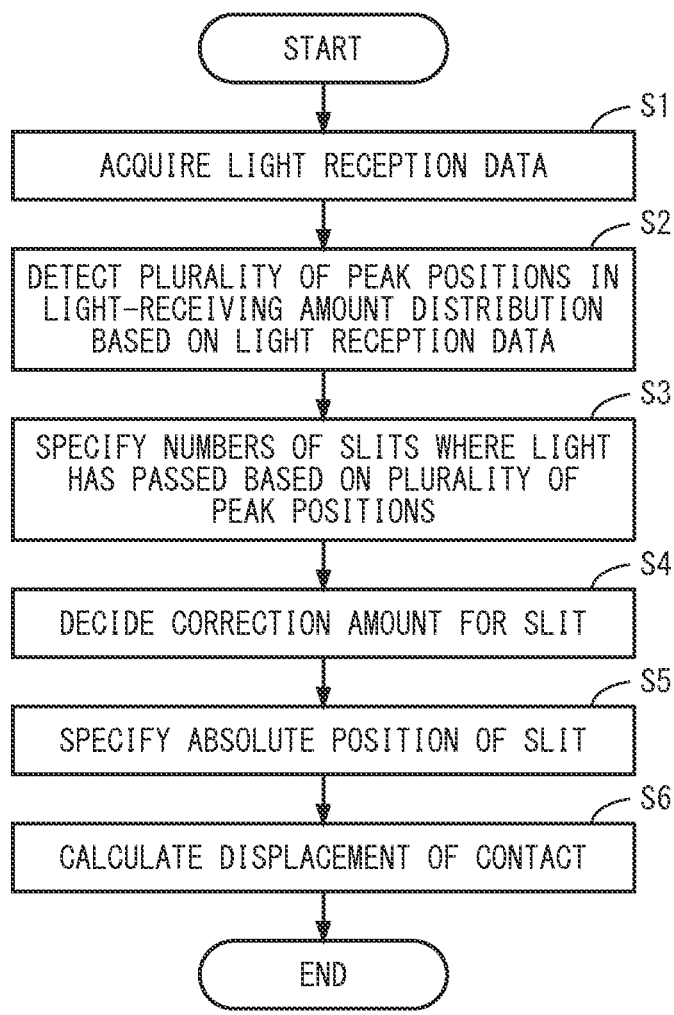
FIG. 11 is a flowchart showing displacement calculation processing.

FIG. 11 is a flowchart showing the displacement calculation processing. With reference to FIG. 11, a description will be given of the displacement calculation processing for the contact 20 by the CPU 61.

The CPU 61 acquires light reception data from a digital signal stored in the memory 62 of FIG. 1 (step S1). Next, the CPU 61 detects a plurality of peak positions in a light-receiving amount distribution based on the light reception data (step S2). The peak positions are detected by performing the data processing on the light-receiving amount distribution shown by the light reception data, and detecting a position where a light-receiving amount reaches a real peak.

Subsequently, the CPU 61 specifies numbers of slits where the light has passed based on the plurality of peak positions (step S3). In the present embodiment, the distances L1 to L3 of FIG. 9 are calculated, and the ratios R1 and R2 are also calculated. The calculated ratios R1 and R2 are checked with the plurality of ratios N11 to N18, N21 to N28, N31 to N38, and N41 to N48, which are previously stored in the memory 62, to thereby associate the plurality of peak positions with the plurality of slits where the light has passed. Further, numbers of the plurality of slits where the light has passed are specified.

Thereafter, the CPU 61 determines a correction amount for the arbitrary slit sq (step S4). In the present embodiment, the correction amount is the multiplication rate R. The correction amount is determined in accordance with the distance from the optical axis 30o of the light-projecting unit 30 to the slit sq in FIG. 10. In determining the correction amount, the distance Lq between the two peak positions gp and gr, which are located with the peak position gq therebetween, is measured. A ratio of the distance Lq with respect to the distance Mq between the two slits sp and sr, which are located with the slit sq therebetween, is calculated, to thereby determine the correction amount.

Next, the CPU 61 specifies the absolute position of the slit sq based on the peak position gq and the determined correction amount (step S5). In specifying the absolute position of the slit sq, the distance Lx from the optical axis position P0 to the peak position gq is calculated. By dividing the distance Lx by the multiplication rate R, the distance Mx from the optical axis 30o of the light-projecting unit 30 to the slit sq is calculated, and the absolute position of the slit sq is specified.

Finally, the CPU 61 calculates displacement of the contact 20 (step S6). In the present embodiment, absolute positions of a plurality of slits where the light from the light-projecting unit 30 has passed are calculated, and a plurality of absolute positions of the contact 20 which respectively correspond to the absolute positions of the plurality of slits are calculated. The plurality of calculated absolute positions of the contact 20 are averaged, to thereby calculate the absolute position of the contact 20. A change in absolute position of the contact 20 is calculated, to thereby calculate displacement of the contact 20.

Hence, it is possible to calculate displacement of the contact 20 with high accuracy. Further, even when a peak position corresponding to a slit on the scale 50 is not detected due to adhesion of dust or the like to the slit, an error of the calculated displacement of the contact 20 can be reduced.

In addition, since the scale 50 has a predetermined thickness, refraction of light having passed through a slit in a position close to the optical axis 30o is smaller than refraction of light having passed through a slit in a position distant from the optical axis 30o. Therefore, the accuracy in calculation of an absolute position of the slit in the position close to the optical axis 30o is higher than the accuracy in calculation of an absolute position of the slit in the position distant from the optical axis 30o.

For this reason, in calculating the absolute position of the contact 20, a weight of the absolute position of the slit in the position close to the optical axis 30o is made larger than a weight of the absolute position of the slit in the position distant from the optical axis 30o, and a plurality of absolute positions of the contact 20 are then averaged. Hence, it is possible to more correctly calculate the absolute position of the contact 20.

(7) Effect

In the present embodiment, the light-projecting unit 30 irradiates the scale 50 with non-parallel light, and the non-parallel light having passed through a plurality of slits on the scale 50 are received by the light-receiving unit 40. In this case, an absolute position of a slit corresponding to an arbitrary peak position can be calculated by using the multiplication rate R indicating a relation of a distance between a plurality of peak positions in a light-receiving amount distribution on the light-receiving unit 40 and a distance between a plurality of slits on the scale 50 which respectively correspond to the plurality of peak positions. Hence, there is no need to provide an optical element for collimating light, such as the collimator lens, between the light-projecting unit 30 and the scale 50. It is thereby possible to reduce the size of the contact displacement meter 100 in a direction orthogonal to the moving direction of the contact 20.

Further, in the present embodiment, each of the plurality of slits on the scale 50 is uniquely identifiably arrayed by use of an identifier which is based on a distance between a plurality of slits including the slit and having a predetermined positional relation. Therefore, based on a ratio of distances between a plurality of peak positions having a predetermined relation out of the detected plurality of peak positions, positions of slits corresponding to the plurality of peak positions are identified. Therefore, even when the parallelism between the light-receiving surface of the light-receiving unit 40 and the scale 50 is low or when the parallelism between the light-receiving surface of the light-receiving unit 40 and the scale 50 varies with movement of the contact 20, each slit on the scale 50 can be correctly identified.

Moreover, the multiplication rate R for calculating a position of an arbitrary slit is calculated after each of the slits on the scale 50 have been identified, and a distance between the arbitrary slit and the optical axis 30o of the light-projecting unit 30 is calculated based on the multiplication rate R. Therefore, even when the parallelism between the light-receiving surface of the light-receiving unit 40 and the scale 50 is low or when the parallelism between the light-receiving surface of the light-receiving unit 40 and the scale 50 varies with movement of the contact 20, the absolute position of the contact 20 can be correctly calculated.

Hence, it is possible to alleviate the accuracy in assembly of the casing 10, the contact 20, the light-projecting unit 30, the light-receiving unit 40, and the scale 50. Consequently, cost of the contact displacement meter is reduced.

[2] Second Embodiment

(1) Displacement Calculation Processing

A description will be given of points in which a contact displacement meter 100 according to a second embodiment is different from the contact displacement meter 100 according to the first embodiment.

In the present embodiment, a multiplication rate, set based on the distances between the light-projecting unit 30, the light-receiving unit 40, and the scale 50 is previously stored in the memory 62 of FIG. 1 as position calculation data. Further, the 39 distances m1 to m10 between the slits on the scale 50 of FIGS. 3 to 6 are stored in the memory 62 so as to correspond to the array of the slits s1 to s40.

The multiplication rate previously stored in the memory 62 is, for example, a multiplication rate of a distance between a plurality of peak positions with respect to a distance between slits in the vicinity of the optical axis 30o of the light-projecting unit 30. This multiplication rate is a ratio of a distance between the light-projecting unit 30 and the light-receiving unit 40 with respect to a distance between the light-projecting unit 30 and the scale 50, and it is known.

Figure 12:
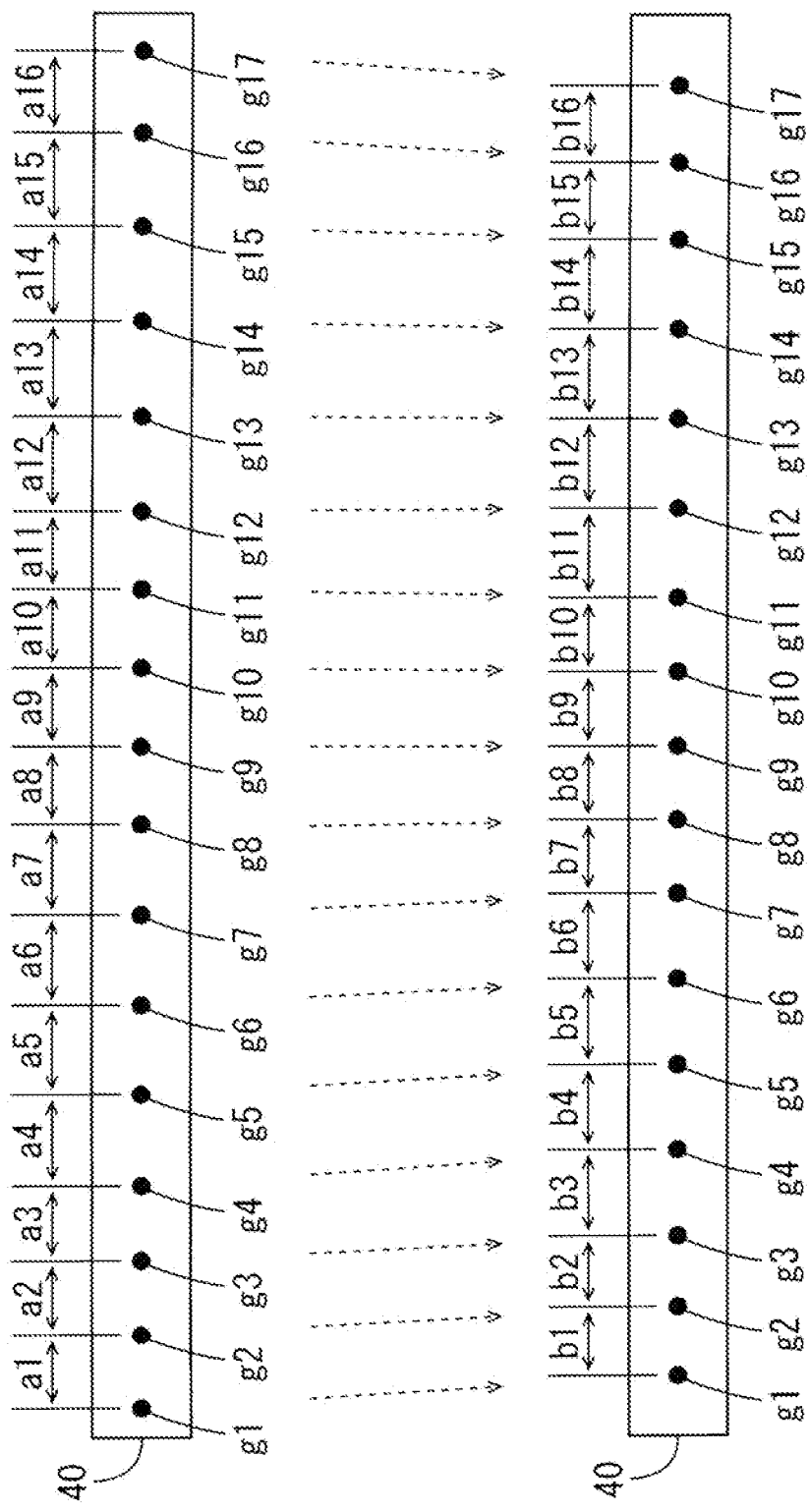
FIG. 12 is a view for describing a specification procedure for numbers of slits in a second embodiment.

In the present embodiment, in step S3 of FIG. 11, numbers of slits where the light has passed are specified by the following procedure in place of the procedure of FIG. 10. FIG. 12 is a view for describing a specification procedure for numbers of slits in the second embodiment. In the example of FIG. 12, a plurality of peak positions g1 to g17 respectively corresponding to a plurality of slits where the light has passed are indicated by black circles.

As shown in FIG. 12, distances a1 to a16 between the adjacent peak positions g1 to g17 are calculated. Next, a distance from the optical axis position P0 to each of the peak positions g1 to g17 is divided by the multiplication rate stored in the memory 62, to thereby respectively correct the distances a1 to a16 to distances b1 to b16.

An array of the corrected distances b1 to b16 is checked with an array of the plurality of distances m1 to m10 on the scale 50 previously stored in the memory 62. Hence, it is possible to specify numbers of the plurality of slits where the light has passed, and respectively associate the plurality of peak positions g1 to g17 with the plurality of slits where the light has passed.

As described above, in this example, the multiplication rate previously stored in the memory 62 is a multiplication rate of a distance between a plurality of peak positions with respect to a distance between slits in the vicinity of the optical axis 30o of the light-projecting unit 30. However, since the light emitted from the light-projecting unit 30 expands at a predetermined angle, an actual multiplication rate in the position distant from the optical axis 30o is slightly (e.g., in the order of 2%) larger than the multiplication rate in the vicinity of the optical axis 30o.

For this reason, an array of distances between peak positions in the position close to the optical axis 30o agree with an array of the distances m1 to m10 with higher accuracy than an array of distances between peak positions in the position distant from the optical axis 30o. Therefore, a weight of the array of distances between the peak positions in the vicinity of the optical axis 30o may be made large, and then the array of the distances between the peak positions may be checked with the array of the plurality of distances m1 to m10.

The processing of steps S4 to S6 in FIG. 11 in the present embodiment is similar to the processing of steps S4 to S6 in the first embodiment. In step S4, a multiplication rate of a distance between a plurality of peak positions with respect to a distance between slits is calculated as a correction amount for the arbitrary slit sq.

The multiplication rate calculated in step S4 is different from the multiplication rate previously stored in the memory 62 in terms of being a multiplication rate in accordance with the distance from the optical axis 30o. By use of the multiplication rate in accordance with the distance from the optical axis 30o, the position of the slit sq can be correctly specified in step S5.

(2) Effect

In the present embodiment, the distances between the plurality of slits on the scale 50 are previously stored in the memory 62 so as to correspond to the array of the plurality of slits. A plurality of distances between peak positions are checked with the distances between the plurality of slits previously stored in the memory 62, to thereby identify the positions of the slits which correspond to the plurality of peak positions. In this case, a plurality of slits respectively corresponding to a plurality of peak positions can be readily identified.

[3] Third Embodiment (1) Displacement Calculation Processing

A description will be given of points in which a contact displacement meter 100 according to a third embodiment is different from the contact displacement meter 100 according to the second embodiment.

A direction orthogonal to the optical axis 30o of the light-projecting unit 30 is referred to as an optical-axis orthogonal direction. The casing 10, the contact 20, the light-projecting unit 30, the light-receiving unit 40, and the scale 50 in the present embodiment are assembled with relatively high accuracy. Specifically, the parallelism of the light-receiving surface of the light-receiving unit 40 with respect to the optical-axis orthogonal direction is higher, the parallelism of the contact 20 and the scale 50 with respect to the optical-axis orthogonal direction is higher, and the contact 20 and the scale 50 move in a state where the parallelism is held with respect to the optical-axis orthogonal direction. Therefore, a multiplication rate for calculating a position of an arbitrary slit is uniquely set based on the relative positional relation among the light-projecting unit 30, the light-receiving unit 40, the contact 20, and the scale 50.

The multiplication rate in accordance with the distance from the optical axis 30o can be calculated based on a spread angle of the light emitted from the light-projecting unit 30. In the present embodiment, the multiplication rate in accordance with the distance from the optical axis 30o is known. Specifically, a table showing the multiplication rate in accordance with the distance from the optical axis 30o is previously stored as position calculation data in the memory 62 of FIG. 1. Here, the table shows the correspondence relation of the distance from the optical axis 30o and the multiplication rate.

Alternatively, a mathematical expression for calculating the multiplication rate in accordance with the distance from the optical axis 30o is previously stored as position calculation data in the memory 62.

In step S4 of the present embodiment, based on the table or the expression stored in the memory 62, the multiplication rate in accordance with the distance from the optical axis 30o is determined as a correction amount for a slit. In subsequent step S5, the position of the slit sq is specified based on the determined correction amount. In specifying the position of the slit sq, the distance Lx from the optical axis position P0 to the peak position gq is calculated as shown in FIG. 10. By dividing the distance Lx by the multiplication rate at the peak position gq, the distance Mx from the optical axis 30o of the light-projecting unit 30 to the slit sq is calculated, and the absolute position of the slit sq is specified.

Thereafter, processing of step S6 is performed. The processing of step S6 in the present embodiment is similar to the processing of step 6 in the second embodiment.

(2) Effect

In the present embodiment, the multiplication rate of the distance between the plurality of slits with respect to the distance between the plurality of peak positions in accordance with the distance from the optical axis 30o is previously stored in the memory 62. Therefore, based on the multiplication rate which is previously stored in the memory 62, a position of a slit can be readily calculated at high speed.

[4] Fourth Embodiment (1) Displacement Calculation Processing

A description will be given of points in which a contact displacement meter 100 according to a fourth embodiment is different from the contact displacement meter 100 according to the third embodiment.

The casing 10, the contact 20, the light-projecting unit 30, the light-receiving unit 40 and the scale 50 in the present embodiment are assembled with relatively high accuracy. Therefore, a multiplication rate for calculating a position of an arbitrary slit is uniquely set based on the relative positional relation among the light-projecting unit 30, the light-receiving unit 40, the contact 20, and the scale 50.

In the present embodiment, the displacement calculation processing is performed in the order of steps S1, S2, S4, S3, S5, and S6 of FIG. 11. In step S4 of the present embodiment, based on the table or the expression stored in the memory 62, the multiplication rate in accordance with the distance from the optical axis 30o is determined as a correction amount for a slit. In subsequent step S3, numbers of slits are specified by the following procedure in place of the procedure of FIG. 12.

Figure 13:
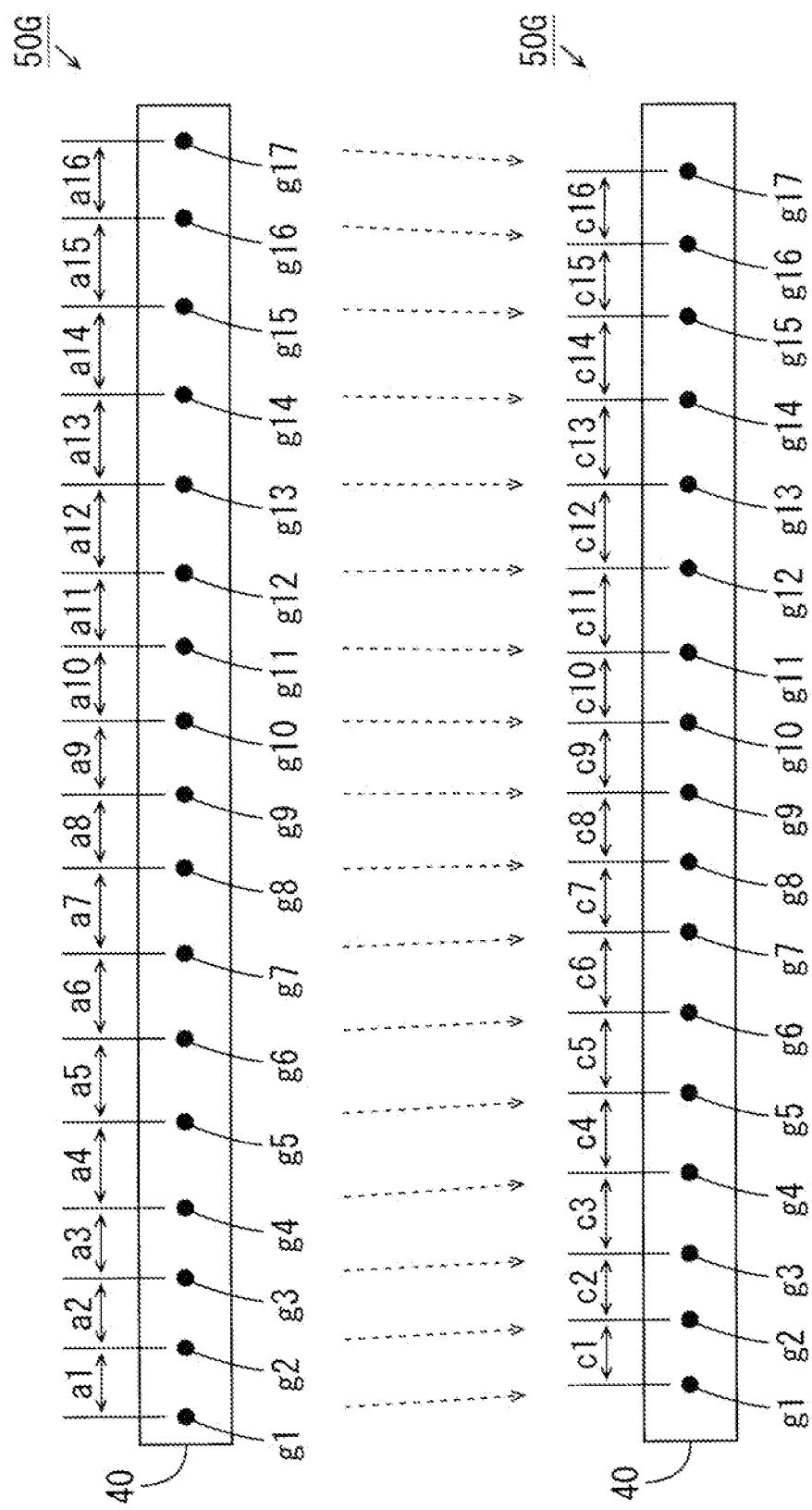
FIG. 13 is a view for describing a specification procedure for numbers of slits in a fourth embodiment.

FIG. 13 is a view for describing a specification procedure for numbers of slits in the fourth embodiment. In the example of FIG. 13, a plurality of peak positions g1 to g17 respectively corresponding to a plurality of slits where the light has passed are indicated by black circles.

As shown in FIG. 13, distances a1 to a16 between the adjacent peak positions g1 to g17 are measured. Next, a distance from the optical axis 30o of the light-projecting unit 30 to each of the peak positions g1 to g17 is divided by the calculated multiplication rate at each of the peak positions g1 to g17, to respectively correct the distances a1 to a16 to distances c1 to c16. The distances c1 to c16 correspond to the distances a1 to a16 between the peak positions g1 to g17 in the case of the scale 50 being irradiated with parallel light from the light-projecting unit 30.

An array of the corrected distances c1 to c16 are checked with an array of the plurality of distances m1 to m10 on the scale 50 previously stored in the memory 62. Hence, it is possible to specify numbers of the plurality of slits where the light has passed, and respectively associate the plurality of peak positions g1 to g17 with the plurality of slits where the light has passed.

Thereafter, processing of steps S5 and S6 is performed. The processing of steps S5 and S6 in the present embodiment is similar to the processing of steps S5 and S6 in the third embodiment.

(2) Effect

In the present embodiment, the multiplication rate of the distance between the plurality of slits with respect to the distance between the plurality of peak positions in accordance with the distance from the optical axis 30o is previously stored in the memory 62. Therefore, based on the multiplication rate previously stored in the memory 62, a position of an arbitrary slit can be readily calculated at high speed. Further, in the present embodiment, by use of a distance between the corrected plurality of peak positions, a slit corresponding to an arbitrary peak position can be identified with high accuracy.

[5] Other Embodiments (1) In the above embodiments, the scale 50 has the plurality of slits, but the present invention is not limited thereto. The scale 50 may have another plurality of light transmitting slits in place of the plurality of slits.

(2) In the above embodiment, the control unit 60 is provided in the cable connecting between the casing 10 and the display unit 70, but the present invention is not limited thereto. When the casing 10 has a sufficiently large accommodation space, the control unit 60 may be accommodated in the casing 10. Alternatively, the control unit 60 may be accommodated in a casing which is different from the casing 10.

(3) In the above embodiment, the position of the slit sq with the position of the optical axis 30o on the scale 50 taken as a reference is calculated as the absolute position, but the present invention is not limited thereto. The position of the slit sq with an arbitrary position on the scale 50 taken as a reference may be calculated as the absolute position.

(4) In the above embodiment, the light-receiving amount peak is the maximum peak of the light-receiving amount which appears in the light-receiving amount distribution by the light from the light-projecting unit 30 passing through the slits, but the present invention is not limited thereto. The light-receiving amount peak may be the minimum peak of a light-receiving amount which appears in a light-receiving amount distribution by the light from the light-projecting unit 30 being shaded by portions (light-shielding portions) other than the slits on the scale 50.

(5) In the first embodiment, the two ratios R1 and R2 are checked with the previously stored plurality of ratios, to thereby associate a plurality of peak positions respectively with a plurality of slits where the light has passed, but the present invention is not limited thereto. One ratio R1 or R2 may be checked with the plurality of previously stored ratios, to thereby associate a plurality of peak positions respectively with a plurality of slits where the light has passed.

(6) In the first embodiment, the ratio of the distance Lq between the peak positions gp and gr with respect to the distance Mq between the slits sp and sr is calculated, to thereby determine the correction amount, but the present invention is not limited thereto. In a manner similar to the third or fourth embodiment, a table showing the multiplication rate in accordance with the distance from the optical axis 30o or the mathematical expression for calculating the multiplication rate in accordance with the distance from the optical axis 30o may be previously stored in the memory 62. In this case, in place of the multiplication rate R, based on the table or the expression stored in the memory 62, the multiplication rate in accordance with the distance from the optical axis 30o is determined as a correction amount for a slit.

(7) In the second embodiment, the multiplication rate previously stored in the memory 62 is a multiplication rate of a distance between a plurality of peak positions with respect to a distance between slits in the vicinity of the optical axis 30o of the light-projecting unit 30, but the present invention is not limited thereto. The multiplication rate previously stored in the memory 62 may be a multiplication rate of a distance between a plurality of peak positions with respect to a distance between slits in an arbitrary position.

[6] Correspondence Relation Between Respective Constitutional Elements of the Claims and Respective Portions of the Embodiments Hereinafter, examples of correspondence between respective constitutional elements of the claims and respective portions of the embodiments will be described, but the present invention is not limited to the following example.

In the above embodiments, the casing 10 is an example of the casing, the contact 20 is an example of the contact, the slits s1 to s40 are an example of the light-projecting units, the scale 50 is an example of the scale, the light-projecting unit 30 is an example of the light-projecting unit, and the light-receiving unit 40 is an example of the light-receiving unit. The CPU 61 is an example of the detecting unit, the calculating unit, and the processing device, the memory 62 is an example of the first and second storage units, and the contact displacement meter 100 is an example of the contact displacement meter.

As the respective constitutional elements of the claims, a variety of other elements each having the configuration or function described in the claims can also be used.

The present invention can be effectively applied to a variety of contact displacement meters.

What is claimed is:
1. A contact displacement meter comprising:
   a casing;
   a contact supported by the casing movably in one direction;
   a scale which has a plurality of light transmitting slits arrayed in the one direction and is configured movably in the one direction along with the contact;
   a light-projecting unit which irradiates the scale with non-parallel light;
   a light-receiving unit which receives the non-parallel light having passed through the plurality of light transmitting slits on the scale, and outputs a light reception signal indicating a light-receiving amount distribution;
   a detecting unit which detects, as a plurality of peak positions, a plurality of positions where a light-receiving amount is at maximum or minimum in the light-receiving amount distribution on the light-receiving unit; and
   a calculating unit which calculates a distance between a reference position and a position of at least one light transmitting slit corresponding to at least one peak posi- tion detected by the detecting unit out of the plurality of light transmitting slits on the scale, based on the plurality of peak positions detected by the detecting unit and correction information showing a relation of a distance between a plurality of peak positions in the light-receiving amount distribution on the light-receiving unit and a distance between a plurality of light transmitting slits on the scale which respectively correspond to the plurality of peak positions, wherein the light-projecting unit and the light-receiving unit are provided in the casing such that the light-projecting unit, the scale, and the light-receiving unit are arrayed in a direction crossing the one direction.

2. The contact displacement meter according to claim 1, wherein each of the plurality of light transmitting slits on the scale is uniquely identifiably arrayed by use of an identifier which is based on a distance between a plurality of light transmitting slits including the light transmitting slit and having a predetermined positional relation, the contact displacement meter is further provided with a first storage unit which stores a plurality of identifiers regarding the plurality of light transmitting slits on the scale, and the calculating unit identifies at least one light transmitting slit corresponding to at least one peak position detected by the detecting unit based on the plurality of peak positions detected by the detecting unit and the plurality of identifiers stored in the first storage unit.

3. The contact displacement meter according to claim 2, wherein each of the plurality of identifiers includes a ratio of distances between three or more peak positions having a predetermined positional relation.

4. The contact displacement meter according to claim 3, wherein the calculating unit calculates a distance between at least two peak positions out of the plurality of peak positions detected by the detecting unit, identifies at least two light transmitting slits corresponding to the at least two peak positions based on the identified at least one light transmitting slit, calculates as the correction information a value showing a relation of the calculated distance between at least two peak positions and a distance between the identified at least two light transmitting slits, and calculates a distance between a reference position and a position of at least one light transmitting slit corresponding to at least one peak position detected by the detecting unit based on the calculated correction information.

5. The contact displacement meter according to claim 3, further comprising a second storage unit which previously stores correction information showing a relation of a distance between a plurality of peak positions in the light-receiving amount distribution on the light-receiving unit and a distance between a plurality of light transmitting slits on the scale which respectively correspond to the plurality of peak positions, wherein a distance between a reference position and a position of at least one light transmitting slit corresponding to at least one peak position detected by the detecting unit is calculated based on the correction information stored in the second storage unit.

6. The contact displacement meter according to claim 2, wherein each of the plurality of identifiers includes a distance between adjacent peak positions.

7. The contact displacement meter according to claim 2, further comprising a second storage unit which previously stores correction information showing a relation of a distance between a plurality of peak positions in the light-receiving amount distribution on the light-receiving unit and a distance between a plurality of light transmitting slits on the scale which respectively correspond to the plurality of peak positions, wherein the calculating unit corrects the plurality of peak positions detected by the second detecting unit to a plurality of positions corresponding to a plurality of light transmitting slits based on the correction information stored in the second storage unit, and identifies at least one light transmitting slit corresponding to at least one peak position detected by the detecting unit based on the corrected plurality of positions and the plurality of identifiers stored in the first storage unit.

8. The contact displacement meter according to claim 1, wherein the detecting unit performs data processing on the light-receiving amount distribution of the light reception signal outputted from the light-receiving unit, to detect a plurality of peak positions in units smaller than a pixel of the light-receiving unit.

9. The contact displacement meter according to claim 1, wherein the reference position is a position of an optical axis of the light-projecting unit on the scale.

* * * * *